United States Patent
Gancarz

(10) Patent No.: US 11,687,478 B2
(45) Date of Patent: Jun. 27, 2023

(54) SYSTEM AND A METHOD FOR SECURE DATA TRANSFER USING AIR GAPPING HARDWARE PROTOCOL

(71) Applicant: Fundacja "Blockchain Development Foundation", Lodz (PL)

(72) Inventor: Kamil Rafal Gancarz, Zgierz (PL)

(73) Assignee: BITFOLD AG, Baar (CH)

( * ) Notice: Subject to any disclaimer, the term of this patent is extended or adjusted under 35 U.S.C. 154(b) by 0 days.

(21) Appl. No.: 17/151,811

(22) Filed: Jan. 19, 2021

(65) Prior Publication Data

US 2021/0224212 A1    Jul. 22, 2021

(30) Foreign Application Priority Data

Jan. 20, 2020   (EP) ................................. 20461503

(51) Int. Cl.
*G06F 13/28* (2006.01)
*G06F 13/40* (2006.01)
(Continued)

(52) U.S. Cl.
CPC .......... *G06F 13/4022* (2013.01); *H04L 9/006* (2013.01); *H04L 9/083* (2013.01); *H04L 9/3213* (2013.01); *G06F 9/544* (2013.01)

(58) Field of Classification Search
CPC ...... G06F 13/4022; G06F 9/544; G06F 21/72; G06F 21/85; H04L 9/006; H04L 9/083;
(Continued)

(56) References Cited

U.S. PATENT DOCUMENTS 7,583,169 B1 * 9/2009 Scardelletti ............ H01P 1/127
                                                    333/262
8,984,275 B2 * 3/2015 Ozgit .................. H04L 63/1425
                                                    713/154
(Continued)

FOREIGN PATENT DOCUMENTS

EP         3506587 A1    7/2019

OTHER PUBLICATIONS

Hossein Bidgoli: "Handbook of Information Security, Threats, Vulnerabilities, Prevention, Detection, and Management—vol. 3" in: "Handbook of Information Security, Threats, Vulnerabilities, Prevention, Detection, and Management—vol. 3", Jan. 3, 2006 (Jan. 3, 2006), Wiley, XP055526176, ISBN: 978-0-471-64832-1.

*Primary Examiner* — Henry Tsai
*Assistant Examiner* — Kim T Huynh
(74) *Attorney, Agent, or Firm* — Mark M. Friedman

(57) ABSTRACT

A system for secure data transfer using air gapping. A first module includes: a first module communication interface configured to communicate with a public network. A second module includes: a first read-only memory storing an operating system; a second read-only memory storing sets of private keys of the second module and at least one public key of another remote entity; a cryptographic unit configured to encrypt and/or decrypt data using the keys stored in the second read-only memory. A bridge module includes: a bridge module controller; memory for storing data; a switch configured to selectively connect the bridge module data interface to either the first module data interface or to the second module data interface such that the first module data interface is never connected with the second module data interface.

10 Claims, 6 Drawing Sheets

(51) Int. Cl.
*H04L 9/00* (2022.01)
*H04L 9/08* (2006.01)
*H04L 9/32* (2006.01)
*G06F 9/54* (2006.01)

(58) Field of Classification Search
CPC ............... H04L 9/0825; H04L 63/0471; H04L 63/0442; H04L 63/0209; H04B 1/44
See application file for complete search history.

(56) References Cited

U.S. PATENT DOCUMENTS

| | | | |
|---|---|---|---|
| 11,316,832 B1* | 4/2022 | Sharma | H04L 63/0421 |
| 2011/0187332 A1* | 8/2011 | Salvestrini | H05B 47/18 323/234 |
| 2019/0354970 A1* | 11/2019 | Di Iorio | H04L 9/0869 |
| 2019/0372779 A1 | 12/2019 | Monica et al. | |
| 2020/0028675 A1 | 1/2020 | Gancarz | |
| 2021/0224212 A1* | 7/2021 | Gancarz | H04L 63/0471 |

* cited by examiner

SYSTEM AND A METHOD FOR SECURE DATA TRANSFER USING AIR GAPPING HARDWARE PROTOCOL

TECHNICAL FIELD

The present disclosure relates to a system and a method for secure data transfer between a secured machine or network (such as Intranet etc.) and a public network, such as the Internet, using air gapping hardware protocol.

BACKGROUND

"Air Gapping" is a known procedure related to keeping a computing machine off any network connectivity, or at least off a public network such as the Internet. In other words, an air gap, air wall or air gapping is a network security measure employed on one or more computers to ensure that a secure computer network is physically isolated from unsecured networks, such as the public Internet or an unsecured local area network.

As a result, the air-gapped computing machine is a closed system (in terms of information, signals, etc.), that is inaccessible to remote entities and can be operated only manually by a user (operator).

SUMMARY OF THE INVENTION

A disadvantage of air gapping is that transferring information between the air-gapped computing machine and a remote entity is labor-intensive, often involving human security analysis of prospective software applications or data to be entered onto the air-gapped machine and possibly even human manual re-entry of the data following security analysis.

Furthermore, an air-gapped machine is typically a fully separate hardware system, which requires operating and maintaining two systems, which is inconvenient.

In view of the above, there is a need to design a system for a more convenient secure data transfer using air gapping.

In one aspect, the invention relates to a system for secure data transfer using air gapping. The system comprises a first module comprising: a first module communication interface configured to communicate with a public network; a first module controller and a first module data interface configured send and/or receive data from the public network. The system further comprises a second module comprising: a first read-only memory storing an operating system; a second read-only memory storing sets of private keys of the second module and at least one public key of another remote entity; a cryptographic unit configured to encrypt and/or decrypt data using the keys stored in the second read-only memory; a second module communication interface configured to communicate with a secured machine or a secured network to transmit data from and to the second module; a microcontroller and a second module data interface for communicating with a bridge module. The system also comprises a bridge module comprising: a bridge module controller; a bridge module data interface for communicating with the bridge module controller; memory for storing data; a switch configured to selectively connect the bridge module data interface to either the first module data interface or to the second module data interface such that the first module data interface is never connected with the second module data interface; wherein the bridge module controller is configured to receive data from the second module, store the data in the memory, and send the data to the first module and/or to receive data from the first module, store the data in the memory, and send the data to the second module.

The switch may be a single pole, double throw (SPDT) switch.

The first module and the second module may be integrated with the bridge module in a common housing.

The second module data interface may comprise an input data buffer and an output data buffer.

In another aspect, the invention also relates to a method for secure data transfer using air gapping using a system as described above, the method comprising the steps of: receiving secure data at the second module; encrypting and signing the secure data at the second module; switching the switch of the bridge module to the second module and sending the secure data from the second module to the bridge module; switching the switch of the bridge module to the first module and sending data from the bridge module to the first module; sending data from the first module to a designated recipient via the public network.

The method may further comprise the steps of: receiving secure data at the first module; switching the switch of the bridge module to the first module and sending the secure data from the first module to the bridge module; switching the switch of the bridge module to the second module and verifying if a data packet is signed by an authorized party and sending data from the bridge module to the second module; checking and decrypting data at the second module; sending data from the second module to the secured machine or to the secured network.

These and other features, aspects and advantages of the invention will become better understood with reference to the following drawings, descriptions and claims.

BRIEF DESCRIPTION OF THE DRAWINGS

These and other objects presented herein, are accomplished by providing a system and method for secure data transfer using air gapping hardware protocol. Further details and features of the present disclosure, its nature and various advantages will become more apparent from the following detailed description of the preferred embodiments shown in a drawing, in which.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

DETAILED DESCRIPTION

The following detailed description is of the best currently contemplated modes of carrying out the invention. The description is not to be taken in a limiting sense, but is made merely for the purpose of illustrating the general principles of the invention.

Figure 4:
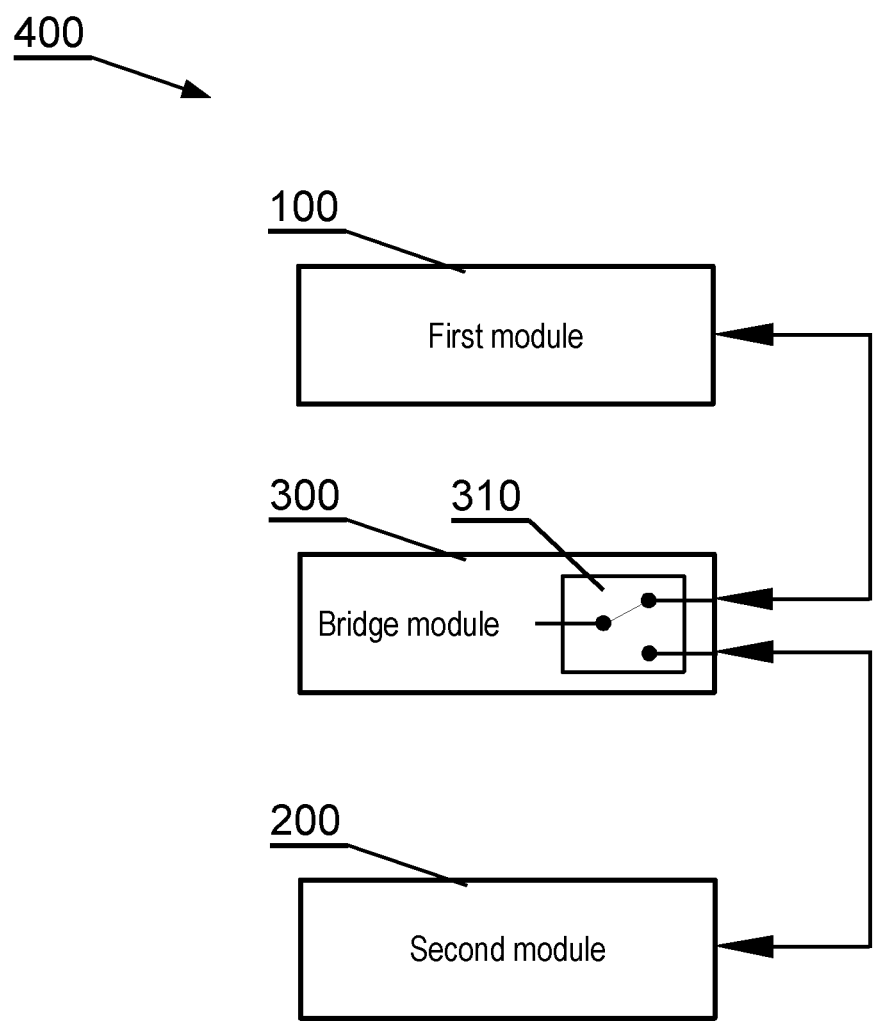
FIG. 4 shows an overview of the system comprising the first module, the second module and the bridge in accordance with an embodiment of the invention.

The system presented herein, having a general structure as shown in FIG. 4 can be configured in particular to provide efficient, convenient and quick secure data transfer between a secured machine or a secured network (to which the second module 200 is connected) and a designated recipient connected via public network, such as the Internet (to which the first module 100 is connected), via LAN cards or similar communication modules.

The system is particularly useful for transfer of sensitive data via a public network that connects facilities processing the sensitive data. For example, a manufacturing corporation may have a plurality of factories that manufacture specific goods and a central hub that collects sensitive data related to the manufacturing processes at each factory. In that case, the manufacturing data may be transmitted via the system 400, wherein the machine generating the sensitive data is connected to the second module 200 which is air gapped from the public network and connected to the public network in a secure manner only in case there is a need to send data to the central hub and/or receive data from the central hub. Moreover, in most cases manufacturing companies cannot risk connecting their facility to the Internet or other publicly available network, because of the risk of hacking the secure IT environment of that facility. The device as described herein prevents unauthorized entities (e.g. hackers) to connect into the secured network or the secured machine by means of air gapping. The system as described herein only allows transfer of secured communication signed with digital cryptographic key of an authorized entity. Furthermore, the system as described herein can be used for secure communication over two described above machines, being in separate locations, connected into a pair over the Internet.

Another use of the device is for secure communication with specialized entities, such as space satellites, wherein it is of utmost importance to prevent access by unauthorized entities.

The system may be realized using dedicated components or custom made FPGA (field-programmable gate array) or ASIC (Application-Specific Integrated Circuit) circuits.

Figure 1:
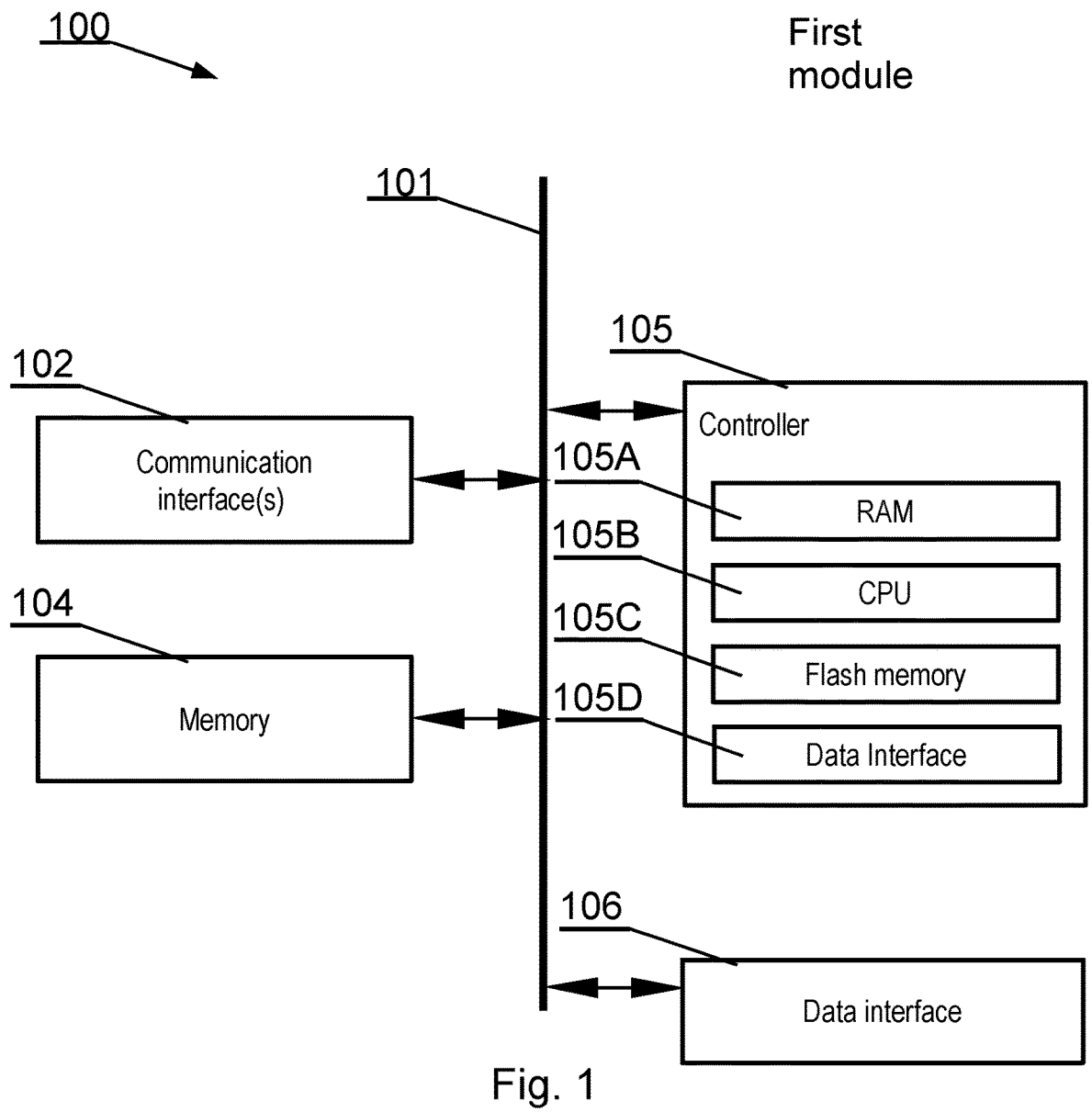
FIG. 1 shows a diagram of a first module of the system presented herein, connected to an unsecured network in accordance with an embodiment of the invention.

FIG. 1 shows a diagram of a first module 100 of the system, which is connected to the Internet (or in general, any public and unsecure network), by a typical protocol such as TCP/IP or similar, via a typical network (LAN) card or similar. The first module 100 is responsible for communication with any external authorized parties related to receiving data from the secured system or sending data to the secured system. In other words, it is a communication module.

The first module 100 comprises a data bus 101 communicatively coupled to other components of the system, so that they may be effectively managed by a first module controller 105.

The Flash memory 104 may store computer program or programs executed by the first module controller 105 in order to execute steps of the method as described below. Further, the Flash memory 104 may store configuration parameters of the first module 100.

A first module communication interface(s) 102 may be a LAN card that uses TCP/IP protocol, or another communication interface (e.g. Wi-Fi, GSM, 3G, LTE, 5G or the like) and is configured to manage communication with the external public network. The first module communication interface 102 may have a dedicated on/off switch so that the user can personally control its operation.

The first module controller 105 may be a system-on-chip comprising: a Random Access Memory (RAM) 105A, a Central Processing Unit (CPU) 105B that is an electronic circuitry within a computer that carries out the instructions of a computer program by performing the basic arithmetic, logical, control and input/output (I/O) operations specified by the instructions stored in a Flash memory 105C; and a Data Interface 105D responsible to receive and/or transmit data to/from other components of the first module 100.

Typically, the first module 100 is configured to establish, via the first module communication interface 102, a communication with a remote server or a client, for example a central hub of a manufacturing company that collects the sensitive data from factories or sends instruction to the manufacturing facility.

Data can be transmitted in an encrypted form between the modules 100 and 300 via a first module data interface 106 allowing access to the data bus 101, for example using TCP/IP technology over Ethernet.

Figure 2:
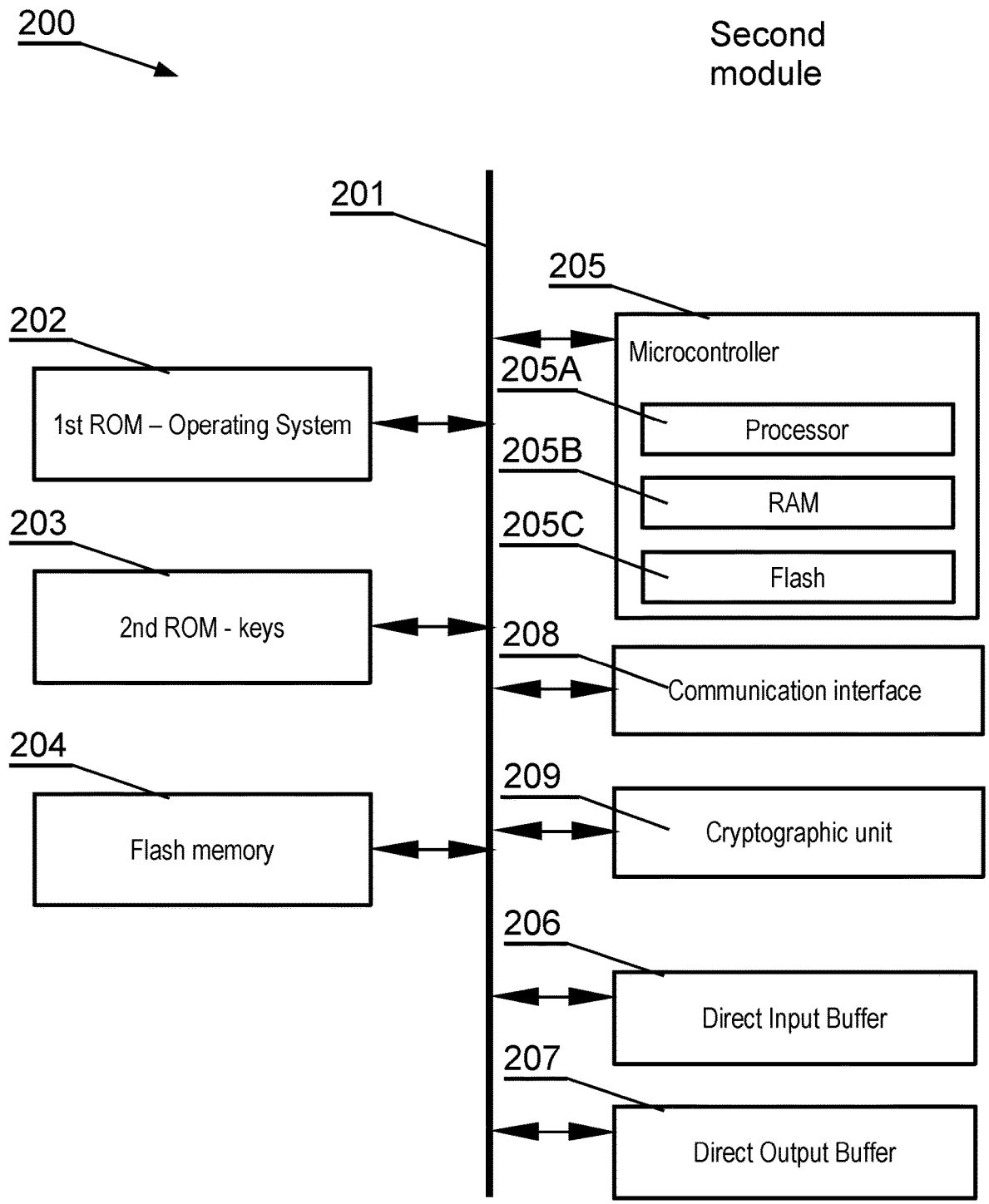
FIG. 2 shows a diagram of a second module of the system presented herein, connected to a secured machine or secured network in accordance with an embodiment of the invention.

FIG. 2 shows a diagram of a second module 200 of the system presented herein. The second module 200 is responsible for communicating with the secured machine or with a secured network (such as Intranet), using a TCP/IP or a similar protocol, via a LAN card or another network connectivity, that generates or receives sensitive data and is never connected to a public network (such as the Internet, or even not connected to any network that is connected to first module 100. However it is connected to secured network or secured machine that is coupled to second module 200).

The second module comprises a data bus 201 communicatively coupling the elements of the module.

A first read-only memory 202 (ROM) stores the operating system of the second module 200 (which, due to being stored in the ROM is not prone to modifications).

The components of the system are communicatively coupled to the data bus 201 so that they may be managed by a microcontroller 205.

A second read-only memory 203 (ROM) stores the authorization keys for validating the messages and instructions received from unsecured network e.g. Internet such as to prevent hacking attempts based on sending any files, viruses etc. or probing second module over the air gap. In particular, it stores a private key associated with the second module 200 for signing and decrypting received data and a public key of a data recipient or senders (or a plurality of keys if data can be sent to different recipients or senders) for encrypting data so that it can be read only by the recipient or validating trustworthiness of received package of data (protection against hackers).

Both ROMs 202 and 203 may be configured for easy replacement in order to facilitate periodic physical update of keys and/or operating system in order to increase security.

A Flash memory 204 is configured to store the sensitive data for encryption (when the data is to be sent out) or decryption (when data is received).

Figure 5:
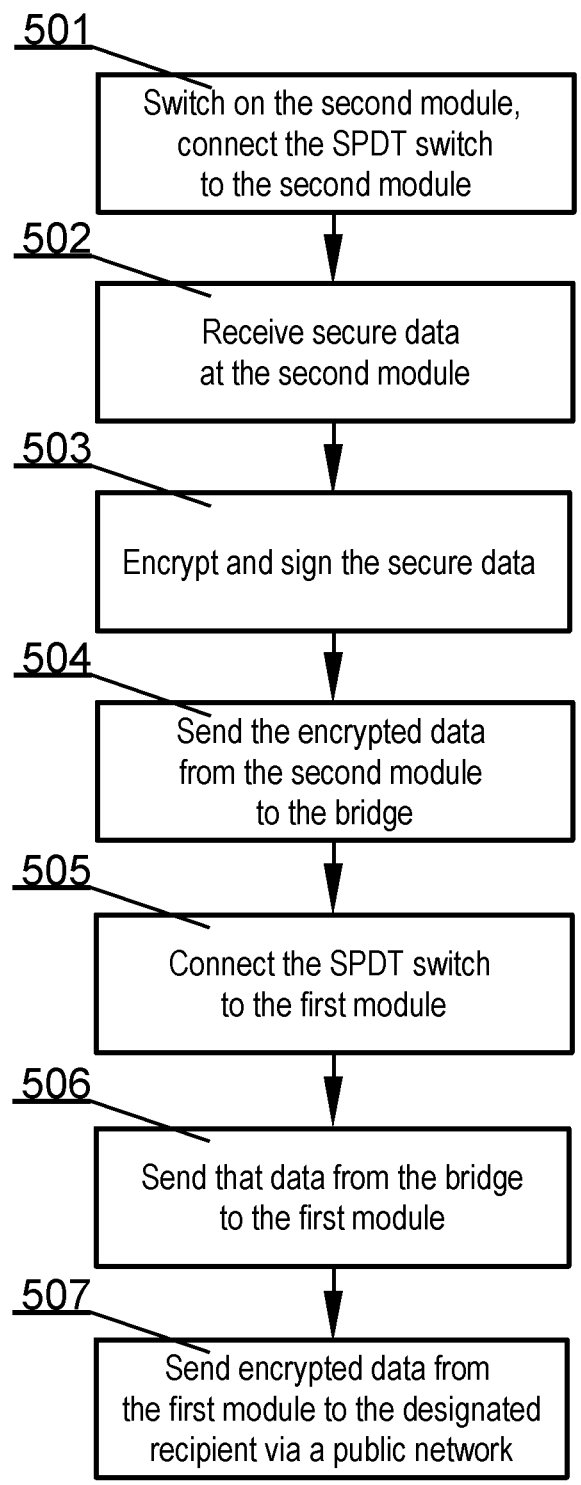
FIG. 5 shows a method of secure data transfer for sending data from a secured environment in accordance with an embodiment of the invention.
Figure 6:
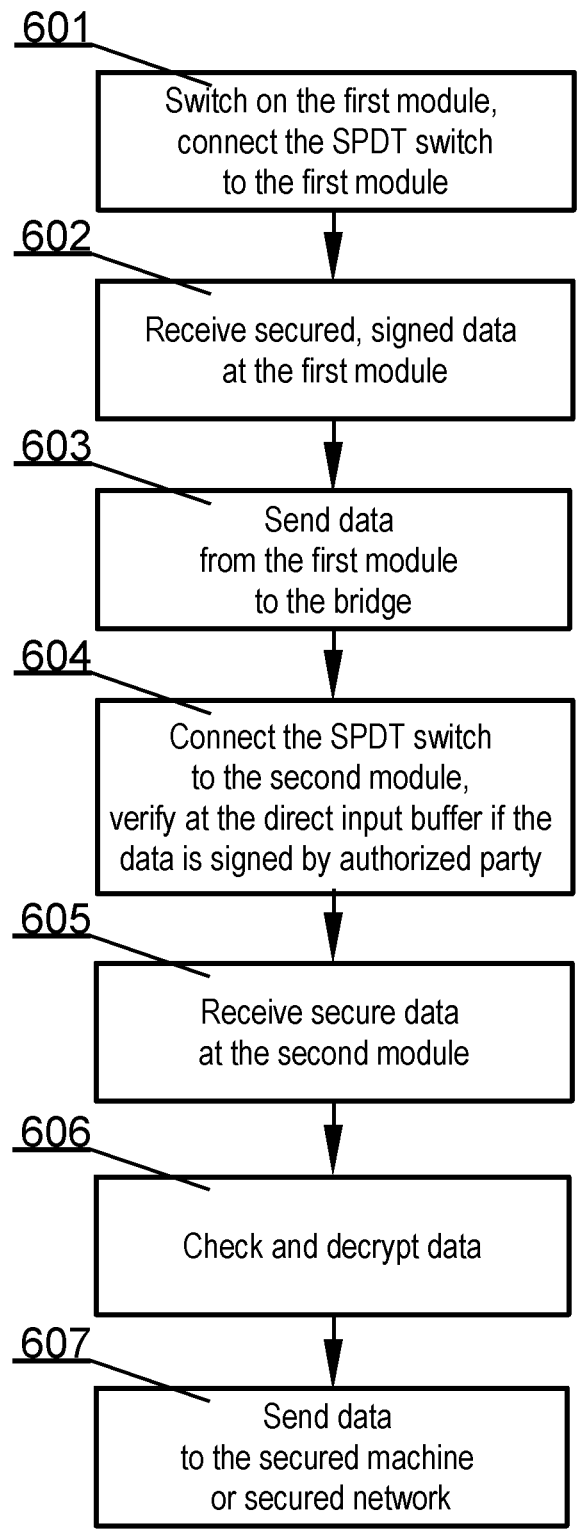
FIG. 6 shows a method of secure data transfer for receiving data to the secured environment in accordance with an embodiment of the invention.

The microcontroller 205 is used to control the functionality of the device, in particular to supervise the methods of secure data transfer as described in FIGS. 5 and 6. The microcontroller 205 may be further used to provide additional functionality to the components of the second module 200. The microcontroller 205 may comprise a processor 205A, operating RAM memory 205B and internal Flash memory 205C.

A second module communication interface 208 is used to communicate with the secured system that generates or receives the secure data. For example, it may be an Ethernet interface configured to communicate with a PLC controller of the secured system or secured network like Intranet (it may use a TCP/IP protocol).

An cryptographic unit 209 is used to encrypt and/or decrypt the sensitive data using the keys stored in the second ROM 203. Preferably, the cryptographic unit 209 has a form of an FPGA circuit that is capable of quickly performing the encryption/decryption algorithms.

Data can be transmitted between the modules 200 and 300 over a second module data interface, preferably in form of data buffers 206, 207 that are configured to communicate with the bridge module interface 309 via the SPDT switch 310. The input buffer 206 is accessible by the second module for reading data therefrom and by the bridge module for storing data therein. The output buffer 207 is accessible by the second module for storing data therein and accessible by the bridge module for reading data therefrom. Each of the data buffers 206, 207 may comprise their own internal processing unit, Flash memory and data interfaces for handling communication with the data bus 201, as well as with the bridge module data interface 309 via the SPDT switch 310. Moreover the input buffer 206 may not pass a data packet inside the second module 200, if that data isn't signed with a proper private key that is paired with public key stored in the ROM 203, therefore it protects the secure environment of second module 200 and in consequence also the secured network or machine that is connected to that module, against breach by unauthorized entities (e.g. hackers).

The second module 200 may be realized using dedicated components or custom made FPGA or ASIC circuits.

The second module 200 along with Bridge module 300 can be integrated in a common housing to form a dedicated device that is connectable to the first module (solely via the bridge module) via an external interface, such as an Ethernet interface. Preferably, all modules 100, 200, 300 can be integrated in a common housing to form a fully functional device.

Figure 3:
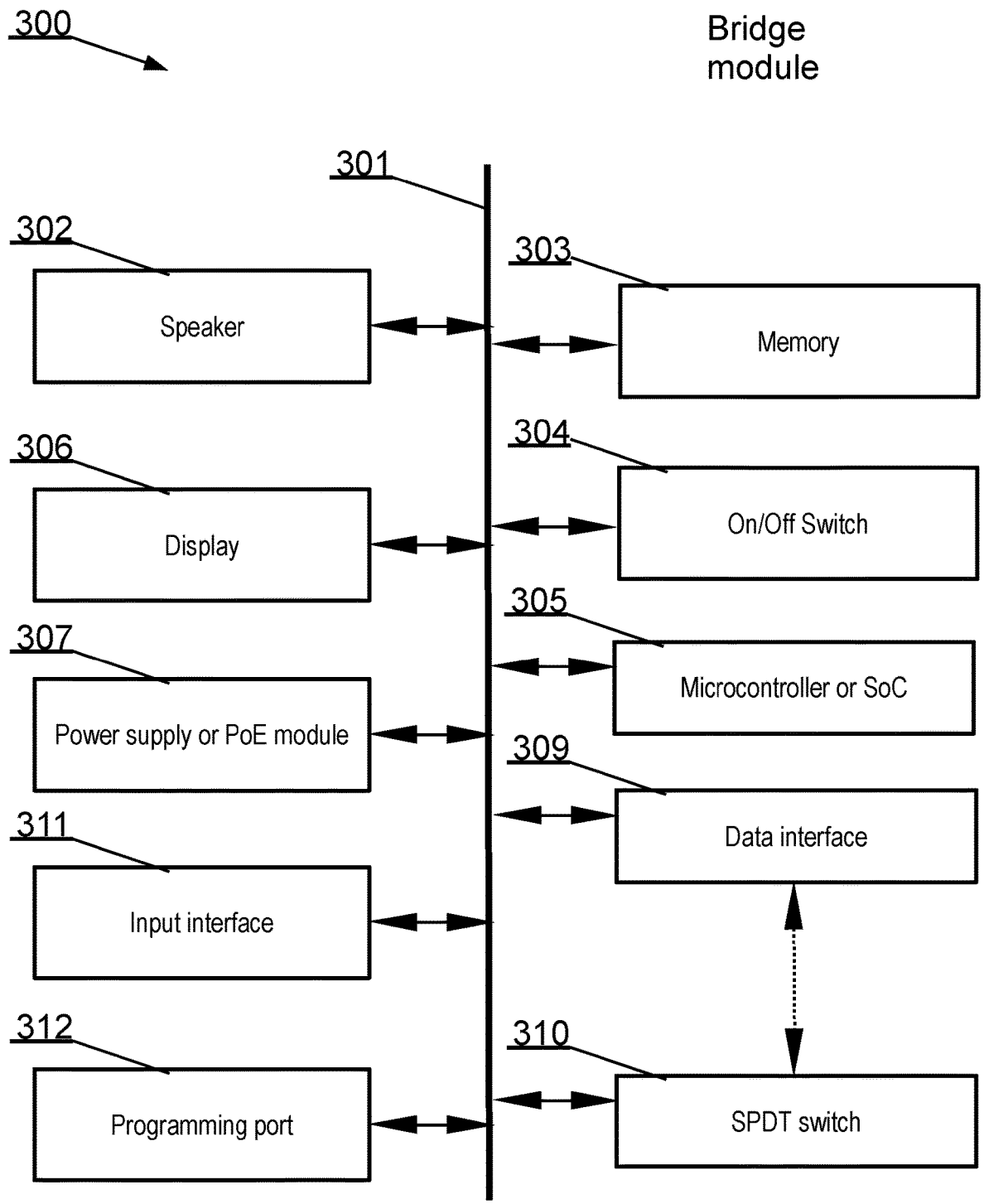
FIG. 3 shows a bridge module operating between the first module and the second module in accordance with an embodiment of the invention.

FIG. 3 shows a bridge module 300 that operates between the first module 100 and the second module 200. The purpose of the bridge module 300 is to pass secure data in a secure manner from the second module 200 to the first module 100 and/or from the first module 100 to the second module 200.

The bridge module 300 may be realized using dedicated components or custom made FPGA or ASIC circuits.

The bridge module 300 comprises a data bus 301 communicatively coupled to a memory 303, such as a Flash memory, for storing the data transmitted via the switch. Additionally, other components of the system are communicatively coupled to the data bus 301 so that they may be managed by a bridge module controller 305.

Data can be transmitted at a given time either between the first module 100 and the bridge 300 or between the second module 200 and the bridge 300. For utmost security, the system is configured such that at any time it is not possible for all the three modules 100, 200, 300 to be active at the same time, by use of the SPDT switch 310 that controls the transmission of data.

The bridge module controller 305 may be a microcontroller or a system-on-chip module comprising the same or similar sub-components as the first module controller 105 and may have a graphics processing unit to control display of information on a display 306, however it is not necessary.

An on/off switch 304 is configured to switch the device on or off when operated by a user. Other typical components include a display 306, an input interface 311 (such as a simple keyboard or a few keys only) and may have a speaker 302 that form components for communication with a user.

The bridge module 300 is powered by module 307 which may be a power supply connected to power source or may be a power supply using Power-over-Ethernet technology.

The bridge module 300 may further comprise a programming port 312 (such as USB, Ethernet, RS232 or alike) to enable programming (or configuring) of the bridge or first module.

The bridge module 300 comprises a bridge module data interface 309 that is configured to communicate with the first module interface 106 or with the data buffers 206, 207 of the second module 200 both via the SPDT switch 310. The bridge module data interface 309 may be connected to the SPDT switch via the data bus 301 or directly via a dedicated connection line.

The SPDT (Single Pole, Double Throw) switch module 310 is configured to data transmission capabilities to only one of the modules at a time: either to the first module 100 or to the second module 200.

Other types of switching modules may be used in place of the SPDT switch, as long as they provide the functionality that the first module data interface 106 is never connected with the data buffers 206, 207 of the second module 200.

FIG. 4 shows an overview of the system comprising the first module 100, the second module 200 and the bridge module 300, wherein the bridge module 300 is selectively connected at any given time either to the first module 100 or to the second module 200 via the SPDT switch 310. The SPDT switch 310 controls transmission of data.

Therefore, the system 400 is able to solve the security problem by being split into at least three modules: the first module 100, the second module 200 and the bridge module 300 that allows passing data between the modules 100 and 200 and allows them to operate independently of each other. The second module 200 is configured to encrypt secure data using its private keys or public keys of recipient, while never being connected to a public network (such as the Internet) and to receive secured (and also encrypted) messages and instructions from unsecured network with method of validating them (and decrypting), to protect the secured machines or network from viruses and hackers breaches.

In particular, the second module 200 is never connected to a public or other unsecured network, because the bridge module 300 at any given instance can be connected either to the first module 100 or to the second module 200. Therefore, it is impossible to for an remote entity (a hacker or a machine operating a spying software) to attempt to directly access the second module 200. The first module 100 also does not have any form of access to the data and content of the second module 200 or network connected to that second module 200.

The functionality of the device is described with reference to methods of secure data transfer of FIGS. 5 and 6. These methods can be supervised by the microcontroller 205.

FIG. 5 shows a method of secure data transfer for sending data from the second module to the designated recipient via public network. First, in step 501 the second module is switched on and the SPDT switch of the bridge is set to the second module 207 direct output buffer.

In general, during operation of the device, both the first module 100 and the second module 200 may be powered on, or only one of the modules 100, 200 may be powered on (for potentially higher security).

Alternatively, the SPDT switch can be connected to the first module 100 when second module 200 is receiving data from the secured network or secured machine connected to second module 200 and then encrypting it, but to transfer already encrypted data to the bridge module 300 in order to procced further with data transfer it requires connecting the SPDT switch to second module 200.

Next, in step 502, secure data is received by the second module. The secure data is then encrypted and signed in step 503, (encrypted using the public key of the recipient to which the data is to be transmitted and signed by the private key of the second module). Next, in step 504, the encrypted data is sent from the second module to the bridge module. After the data is received and stored in the memory of the bridge module, in step 505 the SPDT switch is set to the first module and the data is sent from the bridge module to the first module in step 506. Subsequently, it is sent from the first module to designated recipient via the public network in step 507.

FIG. 6 shows a method of secure data transfer for receiving data by the second module from the public network. First, in step 601 the first module is switched on and the SPDT switch of the bridge is set to the first module.

Alternatively, the SPDT switch can be connected to the second module 200 when receiving data from the public network, but to transfer it to bridge module 300 in order to procced further with data transfer it requires connecting SPDT switch to the first module 100.

In general, during operation of the device, both the first module 100 and the second module 200 may be powered on, or only one of the modules 100, 200 may be powered on (for potentially higher security).

Next, in step 602, data is received by the first module. The data is then sent in step 603 from the first module to the bridge module. After the data is received and stored in the memory of the bridge module, in step 604 the SPDT switch is set to the second module 206 direct input buffer and the data is verified if it is signed by an authorized party and if it can enter into second module, using set of cryptographic keys stored in ROM 203 and computing unit of 206 direct input buffer, if that so the data is being transferred from the bridge module to the second module in step 605. Subsequently, in step 606, data is and decrypted at the second module. Only then unpacked and decrypted data is sent in step 607 from the second module to a secured machine or secured network.

The presented method and system allow to improve security of electronic data transmission while not compromising ease of use. Therefore, they provide a useful, concrete and tangible result. The machine or transformation test is fulfilled and the idea is not abstract.

At least parts of the methods disclosed herein may be computer implemented. Accordingly, the system may take the form of an entirely hardware embodiment, an entirely software embodiment (including firmware, resident software, micro-code, etc.) or an embodiment combining software and hardware aspects that may all generally be referred to herein as a "circuit", "module" or "system".

Furthermore, the present system may take the form of a computer program product embodied in any tangible medium of expression having computer usable program code (including quantum computing software) embodied in the medium.

It can be easily recognized, by one skilled in the art, that the aforementioned method for secure data transfer over an air gap may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the system and method presented herein has been depicted, described, and has been defined with reference to particular preferred embodiments, such references and examples of implementation in the foregoing specification do not imply any limitation on the method or system. It will, however, be evident that various modifications and changes may be made thereto without departing from the broader scope of the technical concept. The presented preferred embodiments are exemplary only and are not exhaustive of the scope of the technical concept presented herein.

Accordingly, the scope of protection is not limited to the preferred embodiments described in the specification but is only limited by the claims that follow.

The invention claimed is:

1. A system for secure data transfer using air gapping, the system comprising:
a first module comprising first module components;
a second module comprising second module components;

a bridge module comprising bridge module components;
wherein the first module components comprise:
- a first module communication interface configured to communicate with a public network;
- a first module controller and a first module data interface configured to send and/or receive data from the public network;

wherein the second module components comprise:
- a first read-only memory storing an operating system;
- a second read-only memory storing sets of private keys of the second module and at least one public key of another remote entity;
- a cryptographic unit configured to encrypt and/or decrypt data using the keys stored in the second read-only memory;
- a second module communication interface configured to communicate with a secured machine or a secured network to transmit data from and to the second module;
- a microcontroller and a second module data interface for communicating with the bridge module;

wherein the bridge module components comprise:
- a bridge module controller;
- a bridge module data interface for communicating with the bridge module controller;
- a memory for storing data;
- a switch configured to selectively connect the bridge module data interface to either the first module data interface or to the second module data interface such that the first module data interface is never connected with the second module data interface;
- wherein the bridge module controller is configured to receive data from the second module, store the data in the memory, and send the data to the first module and/or to receive data from the first module, store the data in the memory, and send the data to the second module.

2. The system according to claim 1, wherein the switch is a single pole, double throw (SPDT) switch.

3. The system according to claim 1, wherein the first module and the second module are integrated with the bridge module in a common housing.

4. The system according to claim 2, wherein the first module and the second module are integrated with the bridge module in a common housing.

5. The system according to claim 1, wherein the second module data interface comprises an input data buffer and an output data buffer.

6. The system according to claim 2, wherein the second module data interface comprises an input data buffer and an output data buffer.

7. The system according to claim 3, wherein the second module data interface comprises an input data buffer and an output data buffer.

8. The system according to claim 4, wherein the second module data interface comprises an input data buffer and an output data buffer.

9. A method for secure data transfer using air gapping using the system of claim 1, the method comprising the steps of:
- receiving secure data at the second module;
- encrypting and signing the secure data at the second module;
- switching the switch of the bridge module to the second module and sending the secure data from the second module to the bridge module;
- switching the switch of the bridge module to the first module and sending data from the bridge module to the first module;
- sending data from the first module to a designated recipient via the public network.

10. A method for secure data transfer using air gapping using the system of claim 1, the method comprising the steps of:
- receiving secure data at the first module;
- switching the switch of the bridge module to the first module and sending the secure data from the first module to the bridge module;
- switching the switch of the bridge module to the second module and verifying if a data packet is signed by an authorized party and sending data from the bridge module to the second module;
- checking and decrypting data at the second module;
- sending data from the second module to the secured machine or to the secured network.

* * * * *